(12) United States Patent
Appelbaum et al.

(10) Patent No.: US 12,528,380 B2
(45) Date of Patent: Jan. 20, 2026

(54) ELECTRIC VEHICLE CHARGE SCHEDULING AND MANAGEMENT USING FLEET-BASED TELEMETRY

(71) Applicant: EVERCHARGE, INC., San Francisco, CA (US)

(72) Inventors: Jason Appelbaum, Oakland, CA (US); John Loren Passmore, Berkeley, CA (US)

(73) Assignee: Evercharge, Inc., San Francisco, CA (US)

( * ) Notice: Subject to any disclaimer, the term of this patent is extended or adjusted under 35 U.S.C. 154(b) by 791 days.

(21) Appl. No.: 17/878,865

(22) Filed: Aug. 1, 2022

(65) Prior Publication Data

US 2023/0051148 A1 Feb. 16, 2023

Related U.S. Application Data

(60) Provisional application No. 63/231,610, filed on Aug. 10, 2021.

(51) Int. Cl.
*H01M 10/44* (2006.01)
*B60L 53/30* (2019.01)
(Continued)

(52) U.S. Cl.
CPC ............. *B60L 53/68* (2019.02); *B60L 53/305* (2019.02); *B60L 53/66* (2019.02); *B60L 53/67* (2019.02); *H02J 7/007188* (2020.01)

(58) Field of Classification Search
CPC ... H02J 7/007188; H02J 7/0044; B60L 53/68; B60L 53/66; B60L 53/67;
(Continued)

(56) References Cited

U.S. PATENT DOCUMENTS 10,879,733 B2 * 12/2020 Lowenthal ............ B60L 53/305
2017/0193424 A1 * 7/2017 Botea ...................... G08G 1/205
(Continued)

FOREIGN PATENT DOCUMENTS

EP         2957450 B1 * 10/2021 .............. B60L 53/68
WO    WO-2019057330 A1 * 3/2019 ............. G06Q 50/06

OTHER PUBLICATIONS

Written Opinion and ISR for counterpart PCT/US2022/039129, filed Aug. 2, 2022.

*Primary Examiner* — Edward Tso
(74) *Attorney, Agent, or Firm* — Renaissance IP Law Group, LLP; David A. Crowther

(57) ABSTRACT

A remote computer server communicates with a fleet of electric vehicles, and gathers telemetry data from the fleet of electric vehicles. An intelligent EVSE unit and/or a DC fast charging unit communicates with the remote server, and charges an electric vehicle based at least in part on the telemetry data from the fleet of electric vehicles. The remote computer server can generate charging instructions based at least in part on the telemetry data gathered from the fleet of electric vehicles. The intelligent EVSE unit and/or the DC fast charging unit receive the charging instructions, and charge the electric vehicle based at least in part on the charging instructions, the telemetry data, and/or an existent electrical load associated with an electrical panel of a house or a building.

20 Claims, 8 Drawing Sheets

(51) Int. Cl.
*B60L 53/66* (2019.01)
*B60L 53/67* (2019.01)
*B60L 53/68* (2019.01)
*H01M 10/46* (2006.01)
*H02J 7/00* (2006.01)

(58) Field of Classification Search
CPC ......... B60L 2240/545; B60L 2240/622; B60L 2240/72; Y02T 90/12; Y02T 90/16; Y02T 90/167
USPC .......................... 320/104, 107, 109, 132, 150
See application file for complete search history.

(56) References Cited

U.S. PATENT DOCUMENTS

2018/0215279 A1* 8/2018 Beekmann ............... B60L 53/31
2020/0160461 A1* 5/2020 Kaniki .................. H02J 7/0013

* cited by examiner

ELECTRIC VEHICLE CHARGE SCHEDULING AND MANAGEMENT USING FLEET-BASED TELEMETRY

RELATED APPLICATION DATA

This application claims the benefit of U.S. Application Ser. No. 62/231,610, filed on Aug. 10, 2021, which is hereby incorporated by reference.

TECHNICAL FIELD

This disclosure relates to electric vehicle charging, and, more particularly, to electric vehicle charge scheduling and management using fleet-based telemetry and one or more intelligent electric vehicle supply equipment (EVSE) units and/or direct current (DC) fast charging units.

BACKGROUND

The adoption of electric vehicles, plug-in hybrid electric vehicles, and the like, continues at a rapid pace. As the deployment of electric vehicles increases, the charging infrastructure must be adapted to meet demand Solar systems are increasingly being installed at houses and buildings as the trend toward greener sources of energy continues. As electric vehicles become more widely adopted, the load that is placed on the electrical infrastructure of the house or building increases. If not properly scheduled and managed, maximum charging loads can be exceeded, which can cause circuits to trip, devices to malfunction, and can even result in dangerous conditions or accidents.

A need remains for improved methods and systems for scheduling and managing electric vehicle charging infrastructure. Embodiments of the invention address these and other limitations in the prior art.

Figure 1A:
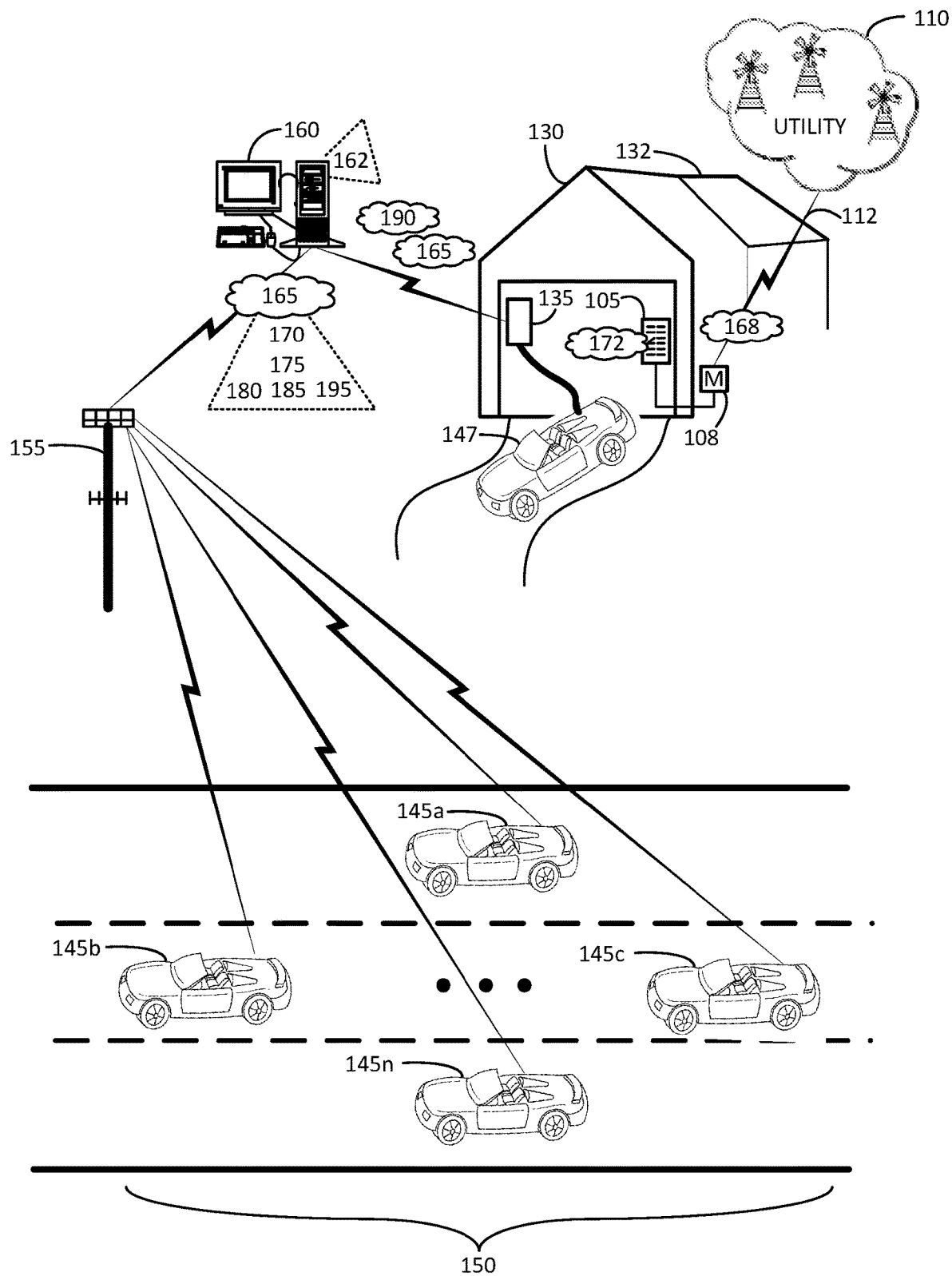
FIG. 1A illustrates a schematic diagram of a fleet of electric vehicles in communication with a cellular tower in association with a remote server and an EVSE unit located in a garage of a house in accordance with some embodiments disclosed herein.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first electric vehicle could be termed a second electric vehicle, and, similarly, a second electric vehicle could be termed a first electric vehicle, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference is often made herein to "electric vehicles." It will be understood that such vehicles can include plug-in hybrid vehicles, pure electric vehicles, an electric golf cart, an electric scooter, an electric bike, an electric skateboard, a SEGWAY®, or any one of a variety of vehicles that operate or move using at least some electricity.

Embodiments of the inventive concept can include a system to collect telemetry data from a fleet of electric vehicles to predict and manage energy usage, improve charge scheduling and management, and reduce charging costs of electric vehicles using EVSE units, which can be installed in one or more homes or buildings.

FIG. 1A illustrates a schematic diagram of a fleet 150 of electric vehicles (e.g., 145a, 145b, 145c, through 145n) in communication with a cellular tower 155 in association with a remote server 160 and an EVSE unit 135 located in a garage 130 of a house 132. The remote server 160 can be a cloud-based server. The remote server 160 can be a computer server that includes one or more microprocessors 162. It will be understood that the fleet 150 of electric vehicles (e.g., 145a, 145b, 145c, through 145n) need not be located in the same geographic area even though they are illustrated as such. In other words, the fleet 150 can be geographically dispersed. Alternatively, the fleet 150 can be in the same general geographic area. It will also be understood that more than one cellular tower 155 may be in communication with the fleet 150.

The one or more cellular towers 155 can be communicatively coupled with a remote server 160. The remote server 160 can collect, process, and/or store telemetry data 165 from the fleet 150 of electric vehicles (e.g., 145a, 145b, 145c, through 145n). More specifically, the one or more microprocessors 162 of the remote server 160 can collect, process, and/or store telemetry data 165 from the fleet 150 of electric vehicles (e.g., 145a, 145b, 145c, through 145n). The telemetry data 165 can include, for example, electric vehicle battery temperature data 170, global positioning system (GPS) data 175, electric vehicle positioning and location data 180, electric vehicle battery charge level data 185, and/or battery drain rate data 195, or the like. In some embodiments, the remote server 165 can continually collect the telemetry data 165 over a period of time for those electric vehicles in the fleet 150 that are active and accessible. In some embodiments, the remote server 165 can periodically collect the telemetry data 165 at certain times for those electric vehicles in the fleet 150 that are active and accessible.

The remote server 160 can be communicatively coupled with an intelligent EVSE unit 135 located in a home garage 130, for example, or other type of building as further described below. The remote server 160 can communicate with the EVSE unit 135 via a wired or wireless network. The intelligent EVSE unit 135 can charge an electric vehicle 147 based at least in part on one or more instructions 190 and/or the telemetry data 165 received from the remote server 160. For example, the remote server 160 can predict energy needs of the EVSE unit 135 based on the telemetry data 165, and send one or more charging instructions 190 and/or the telemetry data 165 itself to the EVSE unit 135 based on the prediction. More specifically, the scheduling and the management of charging the electric vehicle 147 by the EVSE unit 135 can be dependent on the one or more instructions 190 and/or the telemetry data 165.

For example, the remote server 160 can determine that the electric vehicle battery temperature data 170 is indicative of a cold or hot environment in which some or all of the fleet 150 of electric vehicles (e.g., 145a, 145b, 145c, through 145n) are operating. For hot environments, the electric vehicles (e.g., 145a, 145b, 145c, through 145n) likely will run their air-conditioning system more frequently, which can drain the electric vehicle's battery more quickly. The EVSE unit 135 can therefore be directed to take this aspect into account when determining how much charge the electric vehicle 147 should receive each day. For example, the EVSE unit 135 can increase the amount of charge the electric vehicle 147 receives when the environment (i.e., weather) is hot. On the other hand, for cold environments, the charge within the batteries of the electric vehicles (e.g., 145a, 145b, 145c, through 145n) likely will last longer, and therefore, the EVSE unit 135 can therefore be directed to take this aspect into account when determining how much charge the electric vehicle 147 should receive each day. In other words, the EVSE unit 135 can be directed to not charge the battery of the electric vehicle 147 completely, therefore saving energy costs and allowing other vehicles to receive more energy. Each day, the EVSE unit 135 can charge the battery of the electric vehicle 147 to a different level depending on the electric vehicle battery temperature data 170 of the previous day, for example. In some embodiments, the EVSE unit 135 can charge the battery of the electric vehicle 147 based on a real-time flow of the one or more instructions 190 or the telemetry data 165 received from the remote server 160. The remote server 160 can receive, process, and/or store the electric vehicle battery temperature data 170, and send the one or more instructions 190 based on the electric vehicle battery temperature data 170.

By way of another example, the GPS data 175 gathered by the remote server 160 for each of the electric vehicles (e.g., 145a, 145b, 145c, through 145n) can be used to predict battery consumption in real-time and/or over a period of time. For example, when the GPS data 175 reveals that traffic is moving more slowly than usual, more battery charge might be needed to get from place to place, and the EVSE unit 135 can be directed to deliver a higher charge level to the electric vehicle 147. The GPS data 175 can be used to direct the EVSE unit 135 to charge the electric vehicle 147 for a specific amount of time or to a specific charge level. The remote server 160 can receive, process, and/or store the GPS data 175, and send the one or more instructions 190 based on the GPS data 175.

By way of yet another example, the electric vehicle positioning and location data 180 gathered by the remote server 160 for each of the electric vehicles (e.g., 145a, 145b, 145c, through 145n) can be used to predict battery consumption in real-time and/or over a period of time. For example, if the positioning and location data 180 indicates that more people are heading to the beach for the weekend, and therefore have a longer distance to drive than usual, then the EVSE unit 135 can charge the electric vehicle 147 to a higher level. The electric vehicle positioning and location data 180 can be used to direct the EVSE unit 135 to charge the electric vehicle 147 for a specific amount of time or to a specific charge level. The remote server 160 can receive, process, and/or store the electric vehicle positioning and location data 180, and send the one or more instructions 190 based on the electric vehicle positioning and location data 180.

By way of still another example, the remote server 160 can be configured to access the calendar information stored in a mobile device of a driver of the electric vehicle 147. The remote server 160 can use the information in the driver's calendar including times and/or locations of meetings to predict battery consumption in real time and/or over a period of time. The EVSE unit 135 can then be directed to adjust the charge rate of the EVSE unit upwards or downwards to meet the predicted range.

By way of still another example, the remote server 160 can be configured to access information about solar power generation of the building or buildings where the EVSE unit 135 is installed, as well as historical and/or predictive weather data for a particular region. The remote server 160 can then adjust the charge rate of the EVSE unit 135 to optimize the amount of locally generated power that is used to charge the electric vehicle 147.

By way of still another example, the remote server 160 can be configured to access information about distance an employee travels and/or average mileage retrieved from the electric vehicle 147 by the EVSE unit 135. The remote server 160 can then adjust the charge rate of the EVSE unit 135 to optimize the amount of locally generated power that is used to charge the electric vehicle 147.

By way of still another example, the battery drain rate data 195 gathered by the remote server 160 for each of the electric vehicles (e.g., 145a, 145b, 145c, through 145n) can be used to predict battery consumption in real-time and/or over a period of time. The battery drain rate data 195 can then be used to direct the EVSE unit 135 to charge the electric vehicle 147 for a specific amount of time or to a specific charge level. More specifically, if some or all of the fleet 150 of the electric vehicles (e.g., 145a, 145b, 145c, through 145n) experience a battery drain rate that is higher in a particular geographic region (e.g., due to an excessive number of hills, windy environment, weather, or the like), then the EVSE unit 135 can be directed to adjust the charging schedule or charging duration of the electric vehicle 147 to account for such battery drain rate data 195. The remote server 160 can receive, process, and/or store the battery drain rate data 195, and send the one or more instructions 190 based on the battery drain rate data 195.

In some embodiments, the remote server 160 can gather the telemetry data 165 directly from the electric vehicle 147 rather than, or in addition to, the fleet 150 of electric vehicles (e.g., 145a, 145b, 145c, through 145n). Alternatively or in addition, the EVSE unit 135 may gather the telemetry data 165 directly from the electric vehicle 147 rather than, or in addition to, the fleet 150 of electric vehicles (e.g., 145a, 145b, 145c, through 145n). In other words, the telemetry data 165 can be gathered directly from the electric vehicle 147 over a wired connection and/or a wireless connection. The charging scheduling and management can then be controlled by the remote server 160 and/or the EVSE unit 135 based on the telemetry data 165 that is specific to the electric vehicle 147. In some embodiments, the charging scheduling and management can be controlled by the remote server 160 and/or the EVSE unit 135 based on the telemetry data 165 that is specific to the electric vehicle 147 and/or based on the telemetry data 165 of the fleet 150.

In some embodiments, the EVSE unit 135 can use load data gathered from an electric load 168 associated with the house 132 associated with the electric vehicle 147, and increase or decrease the charging level of the electric vehicle 147 to reduce peak load on the house 132. For example, an electric meter 108 may be connected to an electric utility provider 110 via a power line 112. The electric meter 108 may also be connected to an electrical panel 105. The EVSE unit 135 can be connected to the electrical panel 105 and/or to the meter 108. The EVSE unit 135 can communicate with the electrical panel 105 and/or with the meter 108. The EVSE unit 135 can take into account an electrical load imposed on the electrical panel 105 from lighting and other appliances associated with the house 132, while also taking into account the one or more instructions or the telemetry data 165 received from the remote server 160, when making determinations of what load to place on the electrical panel 105 in the form of electric vehicle charging. The EVSE unit 135 can dynamically change the time of day to charge the electric vehicle 147 to avoid peak loads on the electrical panel 105, for example. In other words, the EVSE unit 135 can determine that the peak load time for one day may be different than the peak load time for another day, and can automatically adjust the time of day to charge the electric vehicle 147 for that particular day based on the shifting peak load time. The EVSE unit 135 can predict power shortcomings based on a total amount of installed power at a particular location, and adjust the charging of the electric vehicle 147 accordingly. The EVSE unit 135 can react to loads on the electrical panel 105 of the house 132 by reducing EVSE charging loads to the electric vehicle 147 when other large loads associated with the house 132 are present, thus maximizing use of the available power.

By way of a further example, the intelligent EVSE unit 135 can determine an existent electric load associated with the electrical panel 105 of a house or building, and can charge the electric vehicle 147 based on the telemetry data 165 from the fleet 150 of electric vehicles, and based on the electric load associated with the electrical panel 105. The intelligent EVSE unit 135 can determine, for example, whether to comply with the one or more charging instructions 190 received from the remote server 160 dependent on whether the electrical panel 105 associated with the house or building can accommodate both the existent electrical load and any additional electrical load that would be associated with the one or more charging instructions 190 received from the remote server 160. The intelligent EVSE unit 135 can react to the existent electrical load associated with the electrical panel 105 of the house or building, and reduce a charging load associated with the electric vehicle 147 responsive to the existent electrical load exceeding a predefined electrical load threshold 172.

Figure 1B:
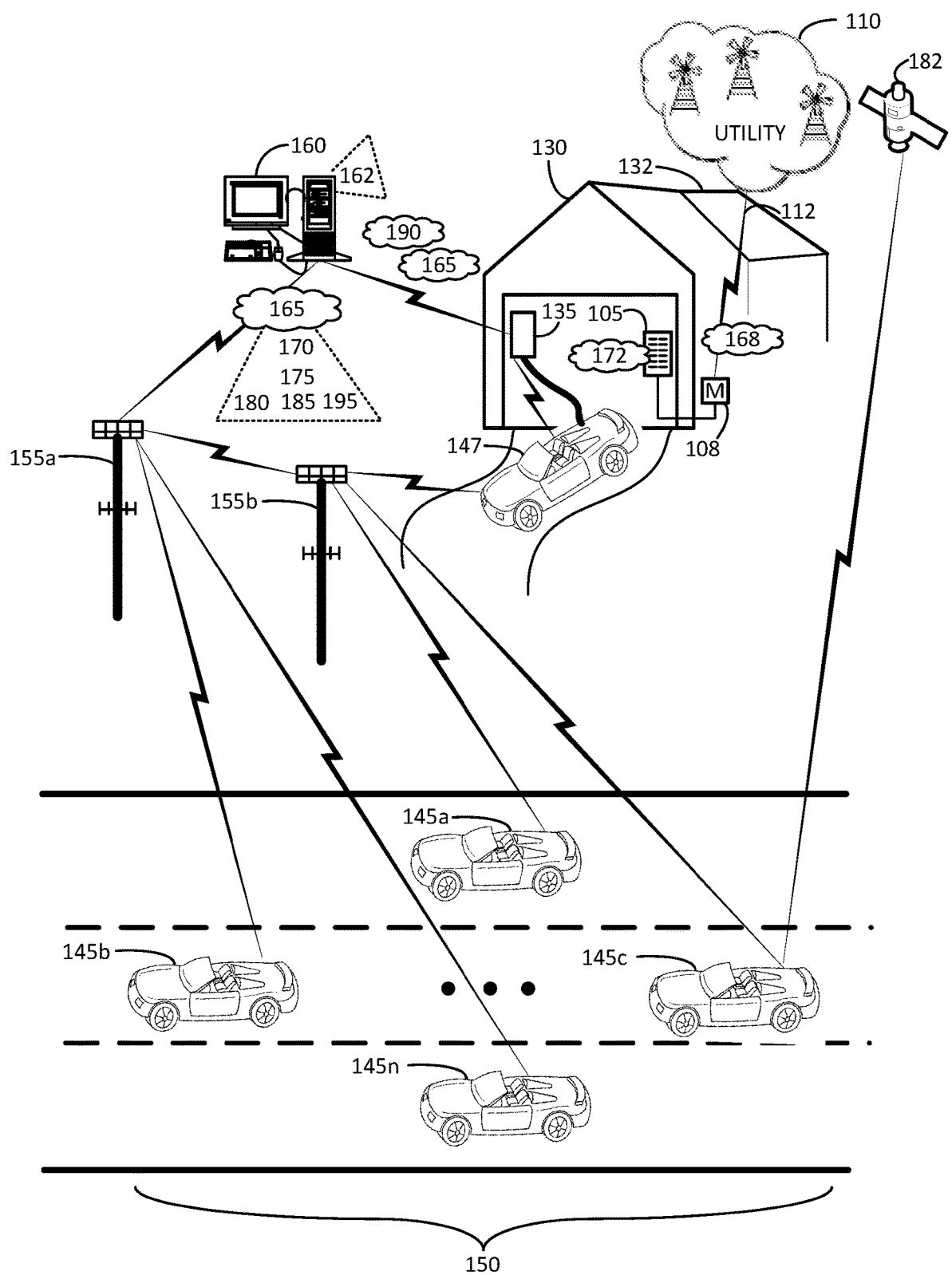
FIG. 1B illustrates a schematic diagram of a fleet of electric vehicles in communication with multiple cellular towers in association with a remote server and an EVSE unit located in a garage of a house in accordance with some embodiments disclosed herein.

FIG. 1B illustrates a schematic diagram of a fleet 150 of electric vehicles (e.g., 145a, 145b, 145c, through 145n) in communication with multiple cellular towers (e.g., 155a, 155b) in association with a remote server 160 and an EVSE unit 135 located in a garage 130 of a house 132. Alternatively or in addition, the electric vehicle 147 can be in communication with a cell tower (e.g., 155b) and/or directly with the EVSE unit 135. Some reference numerals shown in FIG. 1B are described above, and therefore, a detailed description is not necessarily repeated.

In some embodiments, a first subset (e.g., 145a, 145b) of the electric vehicles (e.g., 145a, 145b, 145c, through 145n) can be in communication with a first cellular tower 155a, and a second subset (e.g., 145c through 145n) of the electric vehicles (e.g., 145a, 145b, 145c, through 145n) can be in communication with a second cellular tower 155b. Alternatively or in addition, the fleet 150 can be in communication with one or more low-flying satellites 182 around Earth. The telemetry data 165 can be gathered from the fleet 150 of electric vehicles (e.g., 145a, 145b, 145c, through 145n) via the cellular tower 155a, the cellular tower 155b, and/or the one or more low-flying satellites 182. The remote server 160 can process the telemetry data 165 and instruct the EVSE unit 135 how to charge the electric vehicle 147 based on the telemetry data 165. Alternatively or in addition, the remote server 160 can collect the telemetry data 165 about the electric vehicle 147 itself directly from the electric vehicle 147 itself, and instruct the EVSE unit 135 how to charge the electric vehicle 147 based on the telemetry data 165. Alternatively or in addition, the EVSE unit 135 can collect the telemetry data 165 about the electric vehicle 147 itself directly from the electric vehicle 147 itself, and can charge the electric vehicle 147 based on the telemetry data 165.

Figure 2A:
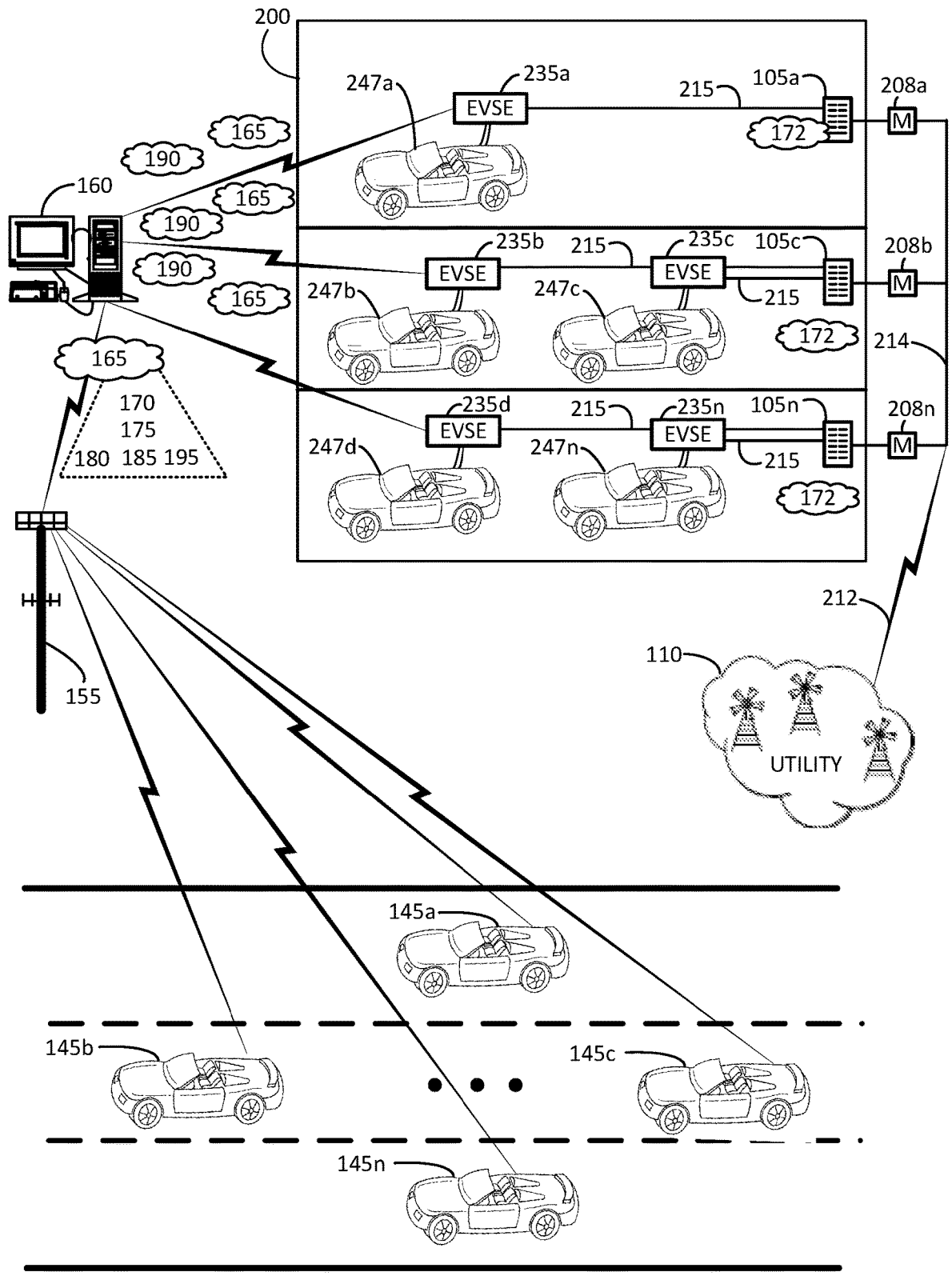
FIG. 2A illustrates a schematic diagram of a fleet of electric vehicles in communication with a cellular tower in association with a remote server and intelligent EVSE units located in a building in accordance with some embodiments disclosed herein.

FIG. 2A illustrates a schematic diagram of a fleet 150 of electric vehicles (e.g., 145a, 145b, 145c, through 145n) in communication with a cellular tower 155 in association with a remote server 160 and intelligent EVSE units (e.g., 235a, 235b, 235c, 235d, through 235n) located in a building 200. It will be understood that the fleet 150 of electric vehicles (e.g., 145a, 145b, 145c, through 145n) need not be located in the same geographic area even though they are illustrated as such. In other words, the fleet 150 can be geographically dispersed. Alternatively, the fleet 150 can be in the same general geographic area. It will also be understood that more than one cellular tower 155 may be in communication with the fleet 150 as illustrated in FIG. 1B. Alternatively or in addition, the fleet 150 can be in communication with low-flying satellites around Earth as also illustrated in FIG. 1B.

The one or more cellular towers 155 can be communicatively coupled with the remote server 160. The remote server 160 can collect, process, and/or store telemetry data 165 from the fleet 150 of electric vehicles (e.g., 145a, 145b, 145c, through 145n). The telemetry data 165 can include, for example, electric vehicle battery temperature data 170, GPS data 175, electric vehicle positioning and location data 180, electric vehicle battery charge level data 185, and/or battery drain rate data 195, or the like. In some embodiments, the remote server 165 can continually collect the telemetry data 165 over a period of time for those electric vehicles in the fleet 150 that are active and accessible. In some embodiments, the remote server 165 can periodically collect the telemetry data 165 at certain times for those electric vehicles in the fleet 150 that are active and accessible.

The remote server 160 can be communicatively coupled with intelligent EVSE units (e.g., 235a, 235b, 235c, 235d, through 235n) located in a building 200, which can include a parking garage, for example. The remote server 160 can communicate with the EVSE units (e.g., 235a, 235b, 235c, 235d, through 235n) via a wired or wireless network. The intelligent EVSE units (e.g., 235a, 235b, 235c, 235d, through 235n) can charge electric vehicles (e.g., 247a, 247b, 247c, 247d, through 247n) based at least in part on one or more instructions 190 or the telemetry data 165 received from the remote server 160. For example, the remote server 160 can predict energy needs of the EVSE units (e.g., 235a, 235b, 235c, 235d, through 235n) based on the telemetry data 165, and send one or more charging instructions 190 and/or the telemetry data 165 itself to the EVSE units (e.g., 235a, 235b, 235c, 235d, through 235n) based on the prediction. More specifically, the scheduling and the management of charging the electric vehicles (e.g., 247a, 247b, 247c, 247d, through 247n) by the EVSE units (e.g., 235a, 235b, 235c, 235d, through 235n) can be dependent on the one or more instructions 190 and/or the telemetry data 165.

For example, the remote server 160 can determine that the electric vehicle battery temperature data 170 is indicative of a cold or hot environment in which some or all of the fleet 150 of electric vehicles (e.g., 145a, 145b, 145c, through 145n) are operating. For hot environments, the electric vehicles (e.g., 145a, 145b, 145c, through 145n) likely will run their air-conditioning system more frequently, which can drain the electric vehicle's battery more quickly. The EVSE units (e.g., 235a, 235b, 235c, 235d, through 235n) can therefore be directed to take this aspect into account when determining how much charge the electric vehicles (e.g., 247a, 247b, 247c, 247d, through 247n) should receive each day. On the other hand, for cold environments, the charge within the batteries of the electric vehicles (e.g., 145a, 145b, 145c, through 145n) likely will last longer, and therefore, the EVSE units (e.g., 235a, 235b, 235c, 235d, through 235n) can therefore be directed to take this aspect into account when determining how much charge the electric vehicles (e.g., 247a, 247b, 247c, 247d, through 247n) should receive each day. In other words, the EVSE units (e.g., 235a, 235b, 235c, 235d, through 235n) can be directed to not charge the battery of the electric vehicles (e.g., 247a, 247b, 247c, 247d, through 247n) completely, therefore saving energy costs. Each day, the EVSE units (e.g., 235a, 235b, 235c, 235d, through 235n) can charge the battery of the electric vehicles (e.g., 247a, 247b, 247c, 247d, through 247n) to a different level depending on the electric vehicle battery temperature data 170 of the previous day, for example. In some embodiments, the EVSE units (e.g., 235a, 235b, 235c, 235d, through 235n) can charge the battery of the electric vehicles (e.g., 247a, 247b, 247c, 247d, through 247n) based on a real-time flow of the one or more instructions 190 or the telemetry data 165 received from the remote server 160. The remote server 160 can receive, process, and/or store the electric vehicle battery temperature data 170, and send the one or more instructions 190 based on the electric vehicle battery temperature data 170.

By way of another example, the GPS data 175 gathered by the remote server 160 for each of the electric vehicles (e.g., 145a, 145b, 145c, through 145n) can be used to predict battery consumption in real-time and/or over a period of time. The GPS data 175 can then be used to direct the EVSE units (e.g., 235a, 235b, 235c, 235d, through 235n) to charge the electric vehicles (e.g., 247a, 247b, 247c, 247d, through 247n) for a specific amount of time or to a specific charge level. The remote server 160 can receive, process, and/or store the GPS data 175, and send the one or more instructions 190 based on the GPS data 175.

By way of yet another example, the electric vehicle positioning and location data 180 gathered by the remote server 160 for each of the electric vehicles (e.g., 145a, 145b, 145c, through 145n) can be used to predict battery consumption in real-time and/or over a period of time. The electric vehicle positioning and location data 180 can then be used to direct the EVSE units (e.g., 235a, 235b, 235c, 235d, through 235n) to charge the electric vehicles (e.g., 247a, 247b, 247c, 247d, through 247n) for a specific amount of time or to a specific charge level. The remote server 160 can receive, process, and/or store the electric vehicle positioning and location data 180, and send the one or more instructions 190 based on the electric vehicle positioning and location data 180.

By way of still another example, the battery drain rate data 195 gathered by the remote server 160 for each of the electric vehicles (e.g., 145a, 145b, 145c, through 145n) can be used to predict battery consumption in real-time and/or over a period of time. The battery drain rate data 195 can then be used to direct the EVSE units (e.g., 235a, 235b, 235c, 235d, through 235n) to charge the electric vehicles (e.g., 247a, 247b, 247c, 247d, through 247n) for a specific amount of time or to a specific charge level. More specifically, if some or all of the fleet 150 of the electric vehicles (e.g., 145a, 145b, 145c, through 145n) experience a battery drain rate that is higher in a particular geographic region (e.g., due to an excessive number of hills, windy environment, weather, or the like), then the EVSE units (e.g., 235a, 235b, 235c, 235d, through 235n) can be directed to adjust the charging schedule or charging duration of the electric vehicles (e.g., 247a, 247b, 247c, 247d, through 247n) to account for such battery drain rate data 195. The remote server 160 can receive, process, and/or store the battery drain rate data 195, and send the one or more instructions 190 based on the battery drain rate data 195.

In some embodiments, the remote server 160 can gather the telemetry data 165 directly from the electric vehicles (e.g., 247a, 247b, 247c, 247d, through 247n) rather than from the fleet 150 of electric vehicles (e.g., 145a, 145b, 145c, through 145n). The charging scheduling and management can then be controlled by the remote server 160 and/or the EVSE units (e.g., 235a, 235b, 235c, 235d, through 235n) based on the telemetry data 165 that is specific to the electric vehicles (e.g., 247a, 247b, 247c, 247d, through 247n). In some embodiments, the charging scheduling and management can be controlled by the remote server 160 and/or the EVSE units (e.g., 235a, 235b, 235c, 235d, through 235n) based on the telemetry data 165 that is specific to the electric vehicles (e.g., 247a, 247b, 247c, 247d, through 247n) and/or based on the telemetry data 165 of the fleet 150.

In some embodiments, the EVSE units (e.g., 235a, 235b, 235c, 235d, through 235n) can use load data gathered from an electric load associated with the building 200 associated with the electric vehicles (e.g., 247a, 247b, 247c, 247d, through 247n), and increase or decrease the charging level of the electric vehicles (e.g., 247a, 247b, 247c, 247d, through 247n) to reduce peak load on the building 200. For example, electric meters (e.g., 208a, 208b, through 208n) may be connected to an electric utility provider 110 via a power line 212. The electric meters (e.g., 208a, 208b, through 208n) may also be connected to electrical panels (e.g., 105a, 105c, through 105n) associated with the building 200. The electrical panels (e.g., 105a, 105c, through 105n) may be connected to the EVSE units (e.g., 235a, 235b, 235c, 235d, through 235n) via power lines 215.

The EVSE units (e.g., 235a, 235b, 235c, 235d, through 235n) can take into account an electrical load imposed on the electrical panels (e.g., 105a, 105c, through 105n) from lighting and other appliances associated with the building 200, while also taking into account the one or more instructions or the telemetry data 165 received from the remote server 160, when making determinations of what load to place on the electrical panels (e.g., 105a, 105c, through 105n) in the form of electric vehicle charging. The EVSE units (e.g., 235a, 235b, 235c, 235d, through 235n) scan change a time of day to charge the electric vehicles (e.g., 247a, 247b, 247c, 247d, through 247n) to avoid peak loads on the electrical panels (e.g., 105a, 105c, through 105n), for example. The EVSE units (e.g., 235a, 235b, 235c, 235d, through 235n) can predict power shortcomings based on a total amount of installed power at the building 200, and adjust the charging of the electric vehicles (e.g., 247a, 247b, 247c, 247d, through 247n) accordingly. The EVSE units ( . . . ) can also react instantaneously to adjust EVSE loads in response to unpredictable building loads, maximizing utilization of the building power. It will be understood that functions and components described above with reference to FIGS. 1A and 1B can be applied and used within the context of the functions and components described with reference to FIG. 2A, without departing from the inventive concepts disclosed herein.

Figure 2B:
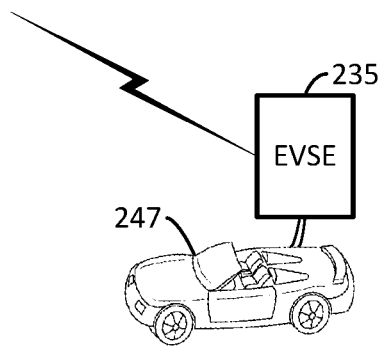
FIG. 2B illustrates a schematic diagram of an intelligent EVSE unit connected to an electric vehicle in accordance with some embodiments disclosed herein.
Figure 2C:
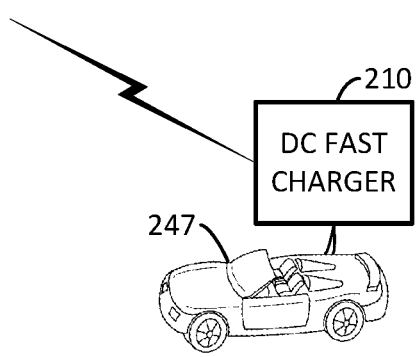
FIG. 2C illustrates a schematic diagram of a DC fast charging unit connected to an electric vehicle in accordance with some embodiments disclosed herein.

FIG. 2B illustrates a schematic diagram of an intelligent EVSE unit 235 connected to an electric vehicle 247 in accordance with some embodiments disclosed herein. FIG. 2C illustrates a schematic diagram of a DC fast charging unit 210 connected to the electric vehicle 247 in accordance with some embodiments disclosed herein. It will be understood that the DC fast charging unit 210 can be used in place of the EVSE unit 235. The embodiments described herein apply equally to the DC fast charging unit 210, and may be used in conjunction with the DC fast charging unit 210.

Figure 3:
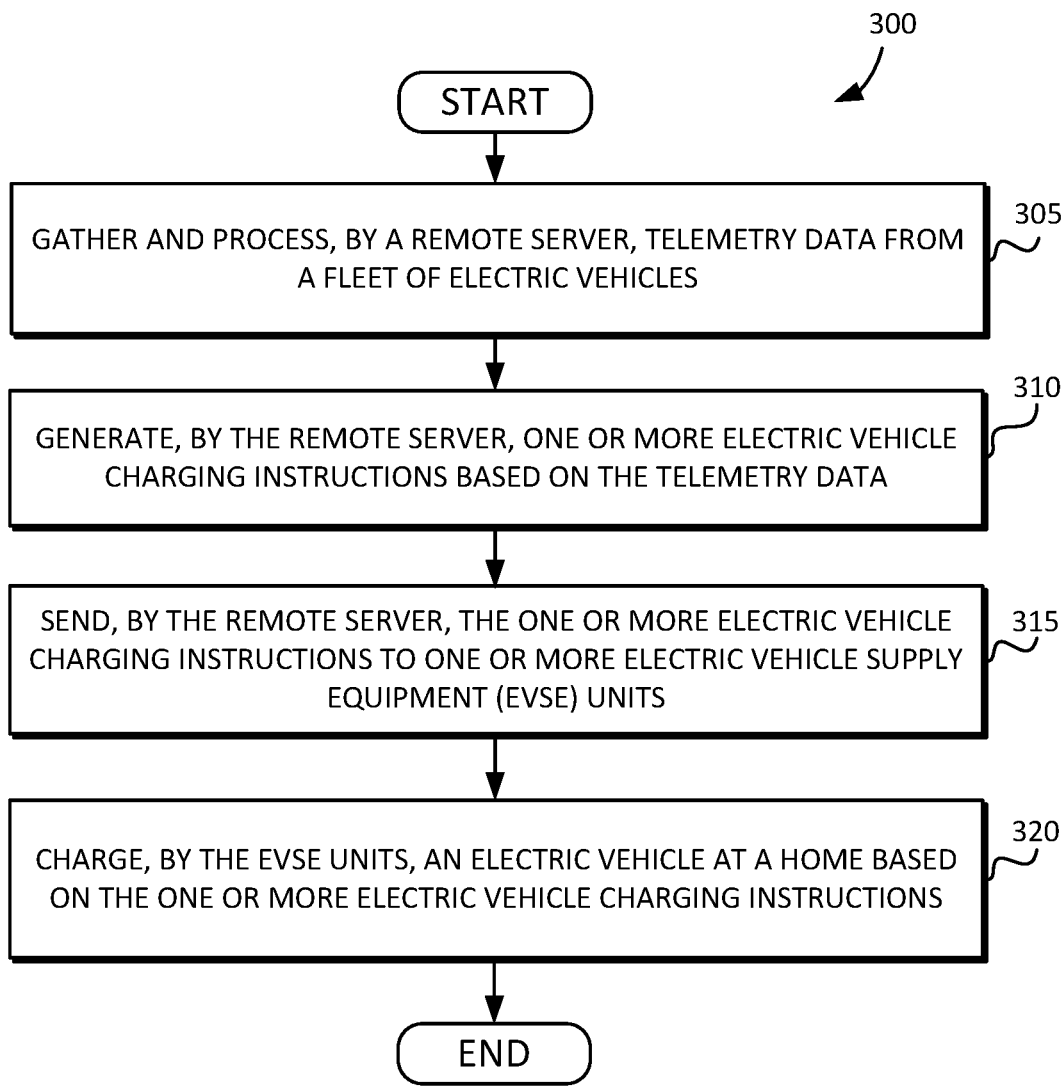
FIG. 3 is a flow diagram illustrating a technique for scheduling and management of electric vehicle charging infrastructure using fleet-based telemetry and one or more intelligent EVSE units and/or DC fast charging units in accordance with some embodiments disclosed herein.

FIG. 3 is a flow diagram 300 illustrating a technique for scheduling and management of electric vehicle charging infrastructure using fleet-based telemetry and one or more intelligent EVSE units in accordance with some embodiments disclosed herein. At 305, a remote server can gather and process telemetry data from a fleet of electric vehicles. At 310, the remote server can generate one or more electric vehicle charging instructions based on the telemetry data. At 315, the remote server can send the one or more electric vehicle charging instructions to one or more EVSE units. At 320, the one or more EVSE units can charge an electric vehicle at a house based on the one or more electric vehicle charging instructions.

Figure 4:
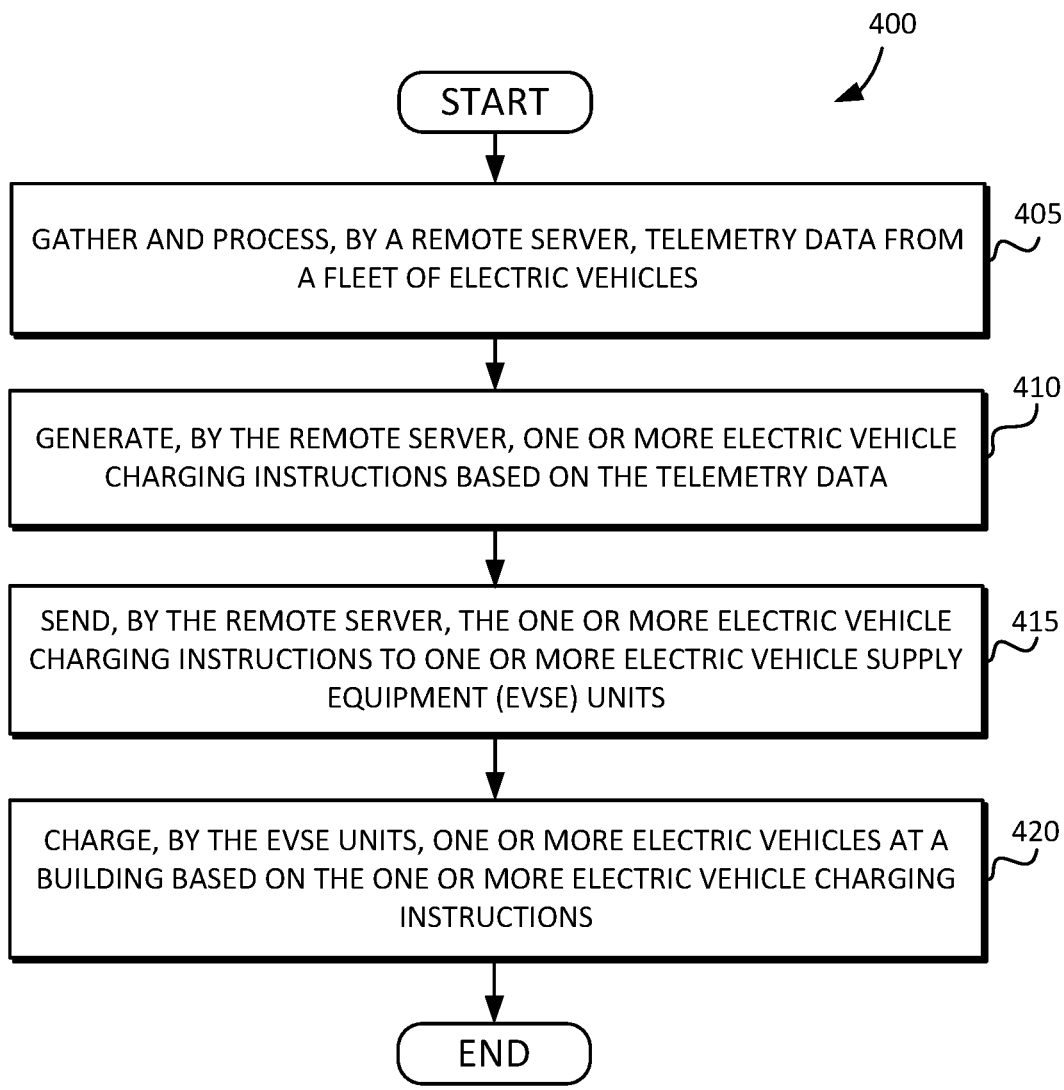
FIG. 4 is a flow diagram illustrating another technique for scheduling and management of electric vehicle charging infrastructure using fleet-based telemetry and one or more intelligent EVSE units and/or DC fast charging units in accordance with some embodiments disclosed herein.

FIG. 4 is a flow diagram 400 illustrating a technique for scheduling and management of electric vehicle charging infrastructure using fleet-based telemetry and one or more intelligent EVSE units in accordance with some embodiments disclosed herein. At 405, a remote server can gather and process telemetry data from a fleet of electric vehicles. At 410, the remote server can generate one or more electric vehicle charging instructions based on the telemetry data. At 415, the remote server can send the one or more electric vehicle charging instructions to one or more EVSE units. At 420, the one or more EVSE units can charge one or more electric vehicles at a building based on the one or more electric vehicle charging instructions.

Figure 5:
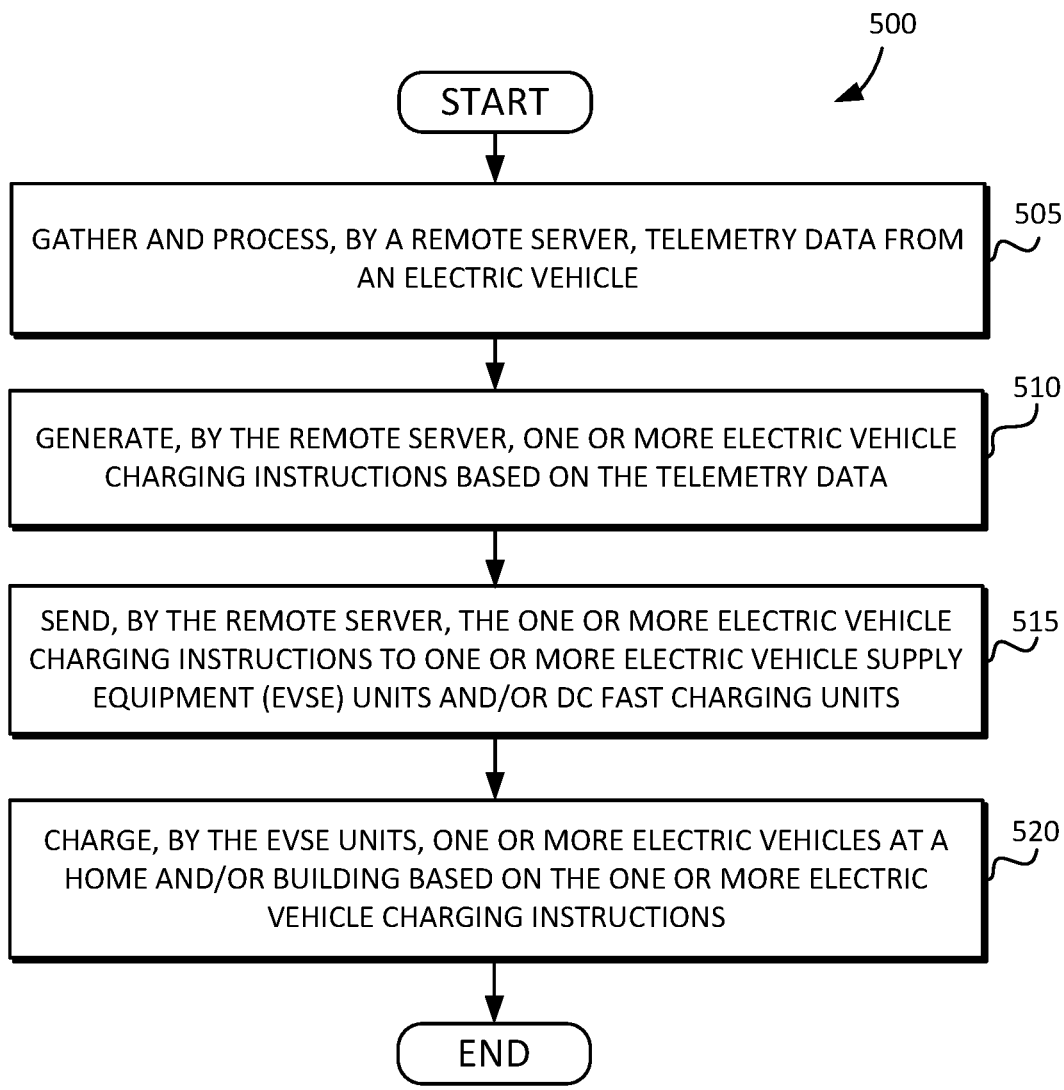
FIG. 5 is a flow diagram illustrating another technique for scheduling and management of electric vehicle charging infrastructure using direct telemetry and one or more intelligent EVSE units and/or DC fast charging units in accordance with some embodiments disclosed herein.

FIG. 5 is a flow diagram 500 illustrating a technique for scheduling and management of electric vehicle charging infrastructure using direct telemetry and one or more intelligent EVSE units and/or DC fast charging units in accordance with some embodiments disclosed herein. At 505, a remote server can gather and process telemetry data directly from an electric vehicle. At 510, the remote server can generate one or more electric vehicle charging instructions based on the telemetry data. At 515, the remote server can send the one or more electric vehicle charging instructions to one or more EVSE units. At 520, the one or more EVSE units can charge one or more electric vehicles at a home and/or building based on the one or more electric vehicle charging instructions.

Figure 6:
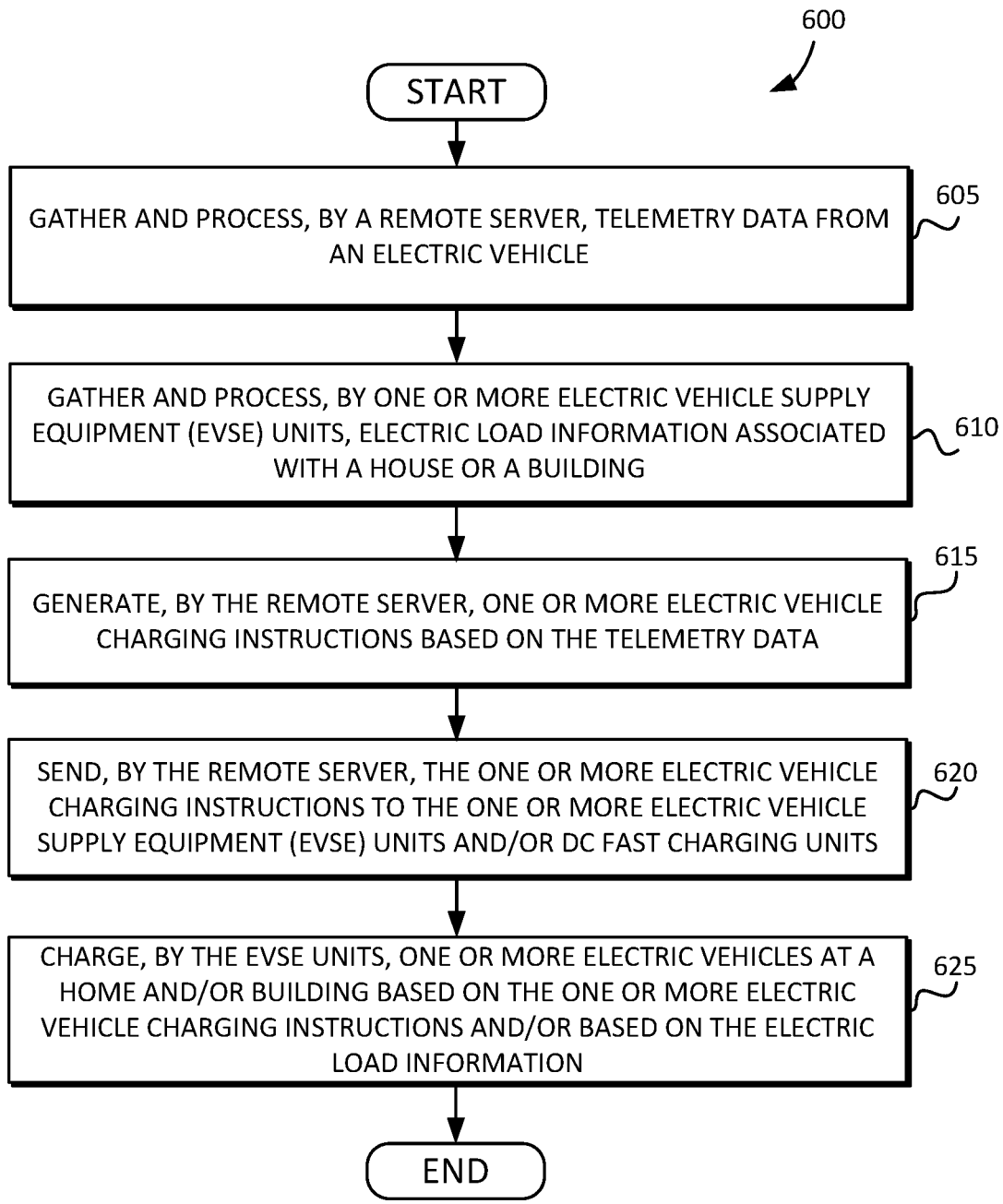
FIG. 6 is a flow diagram illustrating a technique for scheduling and management of electric vehicle charging infrastructure using direct telemetry and one or more intelligent EVSE units and/or DC fast charging units in accordance with some embodiments disclosed herein.

FIG. 6 is a flow diagram 600 illustrating a technique for scheduling and management of electric vehicle charging infrastructure using direct telemetry and one or more intelligent EVSE units and/or DC fast charging units in accordance with some embodiments disclosed herein. At 605, a remote server can gather and process telemetry data from an electric vehicle. At 610, one or more EVSE units can gather and process electric load information associated with a house or a building. At 615, the remote server can generate one or more electric vehicle charging instructions based on the telemetry data. At 620, the remote server can send the one or more electric vehicle charging instructions to the one or more EVSE units and/or to the one or more DC fast charging units. At 625, the one or more EVSE units can charge one or more electric vehicles at a home and/or a building, based on the one or more electric vehicle charging instructions and/or based on the electric load information.

Some embodiments disclosed herein include an electric vehicle charge scheduling and management system. The system can include a remote computer server configured to communicate with a fleet of electric vehicles, and to gather telemetry data from the fleet of electric vehicles. The system can include at least one of an intelligent EVSE unit or a DC fast charging unit configured to communicate with the remote server, and to charge an electric vehicle based at least in part on the telemetry data from the fleet of electric vehicles. In some embodiments, the remote computer server is configured to generate one or more charging instructions based at least in part on the telemetry data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the remote computer server is configured to receive the telemetry data from the fleet of electric vehicles via one or more cellular towers. In some embodiments, the telemetry data includes electric vehicle battery temperature data. In some embodiments, the remote computer server is configured to generate one or more charging instructions based at least in part on the electric vehicle battery temperature data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the telemetry data includes GPS data. In some embodiments, the remote computer server is configured to generate one or more charging instructions based at least in part on the GPS data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the telemetry data includes electric vehicle battery charge level data. In some embodiments, the remote computer server is configured to generate one or more charging instructions based at least in part on the electric vehicle battery charge level data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the telemetry data includes electric vehicle battery drain rate data. In some embodiments, the remote computer server is configured to generate one or more charging instructions based at least in part on the electric vehicle battery drain rate data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the telemetry data includes electric vehicle positioning and location data. In some embodiments, the remote computer server is configured to generate one or more charging instructions based at least in part on the electric vehicle positioning and location data gathered from the fleet of electric vehicles. In some embodiments, the at least one of the intelligent EVSE unit or the DC fast charging unit is configured to receive the one or more charging instructions from the remote computer server via at least one of a wired network or a wireless network. In some embodiments, the at least one of the intelligent EVSE unit or the DC fast charging unit is configured to charge the electric vehicle based at least in part on the one or more charging instructions received from the remote computer server.

In some embodiments, the electric vehicle is not part of the fleet of electric vehicles. In some embodiments, the electric vehicle is part of the fleet of electric vehicles. In some embodiments, the intelligent EVSE unit is configured to determine an existent electric load associated with an electrical panel of at least one of a house or a building, and to charge the electric vehicle based on the telemetry data from the fleet of electric vehicles and based on the electric load associated with the electrical panel.

In some embodiments, the intelligent EVSE unit is configured to determine whether to comply with the one or more charging instructions received from the remote server dependent on whether the electrical panel associated with the at least one of the house or the building can accommodate both the existent electrical load and any additional electrical load that would be associated with the one or more charging instructions received from the remote server. In some embodiments, the intelligent EVSE unit is configured to react to the existent electrical load associated with the electrical panel of the at least one of the house or the building, and to reduce a charging load associated with the electric vehicle responsive to the existent electrical load exceeding a predefined electrical load threshold.

Some embodiments disclosed herein include a method for automatically scheduling and managing electric vehicle charging using fleet-based telemetry. The method can include communicating, by a remote computer server, with a fleet of electric vehicles. The method can include gathering, by the remote computer server, telemetry data from the fleet of electric vehicles. The method can include communicating, by at least one of an intelligent EVSE unit or a DC fast charging unit, with the remote server. The method can include charging, by the intelligent EVSE unit, an electric vehicle based at least in part on the telemetry data from the fleet of electric vehicles.

The method can include generating, by the remote computer server, one or more charging instructions based at least in part on the telemetry data gathered from the fleet of electric vehicles. The method can include receiving, by the at least one of the intelligent EVSE unit or the DC fast charging unit, the one or more charging instructions from the remote computer server via at least one of a wired network or a wireless network. The method can include charging, by the at least one of the intelligent EVSE unit or the DC fast charging unit, the electric vehicle based at least in part on the one or more charging instructions received from the remote computer server.

The method can include receiving, by the remote computer server, the telemetry data from the fleet of electric vehicles via one or more cellular towers. The telemetry data can include electric vehicle battery temperature data, the method can further comprise generating, by the remote computer server, one or more charging instructions based at least in part on the electric vehicle battery temperature data gathered from the fleet of electric vehicles. The method can include receiving, by the at least one of the intelligent EVSE unit or the DC fast charging unit, the one or more charging instructions from the remote computer server via at least one of a wired network or a wireless network. The method can include charging, by the at least one of the intelligent EVSE unit or the DC fast charging unit, the electric vehicle based at least in part on the one or more charging instructions received from the remote computer server.

The telemetry data can include global positioning system (GPS) data, position or location data, electric vehicle battery charge level data, and/or electric vehicle battery drain rate data. The method can include generating, by the remote computer server, one or more charging instructions based at least in part on the GPS data, the position or location data, the electric vehicle battery charge level data, and/or the electric vehicle battery drain rate data, gathered from the fleet of electric vehicles. The method can include receiving, by the at least one of the intelligent EVSE unit or the DC fast charging unit, the one or more charging instructions from the remote computer server via at least one of a wired network or a wireless network. The method can include charging, by the at least one of the intelligent EVSE unit or the DC fast charging unit, the electric vehicle based at least in part on the one or more charging instructions received from the remote computer server.

The method can include determining, by the intelligent EVSE unit, an existent electric load associated with an electrical panel of at least one of a house or a building. The method can include charging the electric vehicle based on the telemetry data from the fleet of electric vehicles and based on the electric load associated with the electrical panel. The method can include determining, by the intelligent EVSE unit, whether to comply with the one or more charging instructions received from the remote server dependent on whether the electrical panel associated with the at least one of the house or the building can accommodate both the existent electrical load and any additional electrical load that would be associated with the one or more charging instructions received from the remote server. The method can include reacting, by the intelligent EVSE unit, to the existent electrical load associated with the electrical panel of the at least one of the house or the building, wherein reacting includes reducing, by the intelligent EVSE unit, a charging load associated with the electric vehicle responsive to the existent electrical load exceeding a predefined electrical load threshold.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. An electric vehicle charge scheduling and management system, comprising:
  a remote computer server configured to communicate with a fleet of electric vehicles, and to gather telemetry data from the fleet of electric vehicles; and
  at least one of an intelligent electric vehicle supply equipment (EVSE) unit or a direct current (DC) fast charging unit configured to communicate with the remote server, and to charge an electric vehicle based at least in part on the telemetry data from the fleet of electric vehicles.

2. The system of claim 1, wherein:
  the remote computer server is configured to generate one or more charging instructions based at least in part on the telemetry data gathered from the fleet of electric vehicles;
  the at least one of the intelligent EVSE unit or the DC fast charging unit is configured to receive the one or more charging instructions from the remote computer server via at least one of a wired network or a wireless network; and
  the at least one of the intelligent EVSE unit or the DC fast charging unit is configured to charge the electric vehicle based at least in part on the one or more charging instructions received from the remote computer server.

3. The system of claim 1, wherein the remote computer server is configured to receive the telemetry data from the fleet of electric vehicles via one or more cellular towers.

4. The system of claim 1, wherein:
  the telemetry data includes electric vehicle battery temperature data;
  the remote computer server is configured to generate one or more charging instructions based at least in part on the electric vehicle battery temperature data gathered from the fleet of electric vehicles;
  the at least one of the intelligent EVSE unit or the DC fast charging unit is configured to receive the one or more charging instructions from the remote computer server via at least one of a wired network or a wireless network; and
  the at least one of the intelligent EVSE unit or the DC fast charging unit is configured to charge the electric vehicle based at least in part on the one or more charging instructions received from the remote computer server.

5. The system of claim 1, wherein:
  the telemetry data includes global positioning system (GPS) data;
  the remote computer server is configured to generate one or more charging instructions based at least in part on the GPS data gathered from the fleet of electric vehicles;
  the at least one of the intelligent EVSE unit or the DC fast charging unit is configured to receive the one or more charging instructions from the remote computer server via at least one of a wired network or a wireless network; and
  the at least one of the intelligent EVSE unit or the DC fast charging unit is configured to charge the electric vehicle based at least in part on the one or more charging instructions received from the remote computer server.

6. The system of claim 1, wherein:
  the telemetry data includes electric vehicle battery charge level data;
  the remote computer server is configured to generate one or more charging instructions based at least in part on the electric vehicle battery charge level data gathered from the fleet of electric vehicles;
  the at least one of the intelligent EVSE unit or the DC fast charging unit is configured to receive the one or more charging instructions from the remote computer server via at least one of a wired network or a wireless network; and
  the at least one of the intelligent EVSE unit or the DC fast charging unit is configured to charge the electric vehicle based at least in part on the one or more charging instructions received from the remote computer server.

7. The system of claim 1, wherein:
  the telemetry data includes electric vehicle battery drain rate data;
  the remote computer server is configured to generate one or more charging instructions based at least in part on the electric vehicle battery drain rate data gathered from the fleet of electric vehicles;
  the at least one of the intelligent EVSE unit or the DC fast charging unit is configured to receive the one or more charging instructions from the remote computer server via at least one of a wired network or a wireless network; and
  the at least one of the intelligent EVSE unit or the DC fast charging unit is configured to charge the electric vehicle based at least in part on the one or more charging instructions received from the remote computer server.

8. The system of claim 1, wherein:
  the telemetry data includes electric vehicle positioning and location data;
  the remote computer server is configured to generate one or more charging instructions based at least in part on the electric vehicle positioning and location data gathered from the fleet of electric vehicles;

the at least one of the intelligent EVSE unit or the DC fast charging unit is configured to receive the one or more charging instructions from the remote computer server via at least one of a wired network or a wireless network; and the at least one of the intelligent EVSE unit or the DC fast charging unit is configured to charge the electric vehicle based at least in part on the one or more charging instructions received from the remote computer server.

9. The system of claim 1, wherein the electric vehicle is not part of the fleet of electric vehicles.

10. The system of claim 1, wherein the electric vehicle is part of the fleet of electric vehicles.

11. The system of claim 1, wherein the intelligent EVSE unit is configured to determine an existent electric load associated with an electrical panel of at least one of a house or a building, and to charge the electric vehicle based on the telemetry data from the fleet of electric vehicles and based on the electric load associated with the electrical panel.

12. The system of claim 11, wherein the intelligent EVSE unit is configured to determine whether to comply with the one or more charging instructions received from the remote server dependent on whether the electrical panel associated with the at least one of the house or the building can accommodate both the existent electrical load and any additional electrical load that would be associated with the one or more charging instructions received from the remote server.

13. The system of claim 11, wherein the intelligent EVSE unit is configured to react to the existent electrical load associated with the electrical panel of the at least one of the house or the building, and to reduce a charging load associated with the electric vehicle responsive to the existent electrical load exceeding a predefined electrical load threshold.

14. A method for automatically scheduling and managing electric vehicle charging using fleet-based telemetry, the method comprising:

communicating, by a remote computer server, with a fleet of electric vehicles;

gathering, by the remote computer server, telemetry data from the fleet of electric vehicles;

communicating, by at least one of an intelligent electric vehicle supply equipment (EVSE) unit or a direct current (DC) fast charging unit, with the remote server; and charging, by the intelligent EVSE unit, an electric vehicle based at least in part on the telemetry data from the fleet of electric vehicles.

15. The method of claim 14, further comprising:

generating, by the remote computer server, one or more charging instructions based at least in part on the telemetry data gathered from the fleet of electric vehicles;

receiving, by the at least one of the intelligent EVSE unit or the DC fast charging unit, the one or more charging instructions from the remote computer server via at least one of a wired network or a wireless network; and charging, by the at least one of the intelligent EVSE unit or the DC fast charging unit, the electric vehicle based at least in part on the one or more charging instructions received from the remote computer server.

16. The method of claim 14, further comprising receiving, by the remote computer server, the telemetry data from the fleet of electric vehicles via one or more cellular towers.

17. The method of claim 14, wherein the telemetry data includes electric vehicle battery temperature data, the method further comprising:

generating, by the remote computer server, one or more charging instructions based at least in part on the electric vehicle battery temperature data gathered from the fleet of electric vehicles;

receiving, by the at least one of the intelligent EVSE unit or the DC fast charging unit, the one or more charging instructions from the remote computer server via at least one of a wired network or a wireless network; and charging, by the at least one of the intelligent EVSE unit or the DC fast charging unit, the electric vehicle based at least in part on the one or more charging instructions received from the remote computer server.

18. The method of claim 1, wherein the telemetry data includes global positioning system (GPS) data, electric vehicle battery charge level data, and electric vehicle battery drain rate data, and the method further comprising:

generating, by the remote computer server, one or more charging instructions based at least in part on the GPS data, the electric vehicle battery charge level data, and the electric vehicle battery drain rate data, gathered from the fleet of electric vehicles;

receiving, by the at least one of the intelligent EVSE unit or the DC fast charging unit, the one or more charging instructions from the remote computer server via at least one of a wired network or a wireless network; and charging, by the at least one of the intelligent EVSE unit or the DC fast charging unit, the electric vehicle based at least in part on the one or more charging instructions received from the remote computer server.

19. The method of claim 14, further comprising:

determining, by the intelligent EVSE unit, an existent electric load associated with an electrical panel of at least one of a house or a building; and charging the electric vehicle based on the telemetry data from the fleet of electric vehicles and based on the electric load associated with the electrical panel.

20. The method of claim 19, further comprising:

determining, by the intelligent EVSE unit, whether to comply with the one or more charging instructions received from the remote server dependent on whether the electrical panel associated with the at least one of the house or the building can accommodate both the existent electrical load and any additional electrical load that would be associated with the one or more charging instructions received from the remote server;

reacting, by the intelligent EVSE unit, to the existent electrical load associated with the electrical panel of the at least one of the house or the building, wherein reacting includes reducing, by the intelligent EVSE unit, a charging load associated with the electric vehicle responsive to the existent electrical load exceeding a predefined electrical load threshold.

* * * * *